(12) United States Patent
Ishibashi

(10) Patent No.: US 8,036,535 B2
(45) Date of Patent: Oct. 11, 2011

(54) PLUGGABLE OPTICAL TRANSCEIVER WITH COMMAND LINE PULLED UP TO EXTERNAL POWER SUPPLY

(75) Inventor: Hiroto Ishibashi, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 725 days.

(21) Appl. No.: 12/076,951

(22) Filed: Mar. 25, 2008

(65) Prior Publication Data

US 2008/0247761 A1    Oct. 9, 2008

(30) Foreign Application Priority Data

Mar. 26, 2007  (JP) ................................. 2007-079421

(51) Int. Cl.
*H04B 10/00* (2006.01)
(52) U.S. Cl. ........ 398/135; 398/138; 398/197; 398/171; 398/90
(58) Field of Classification Search .................. 398/135, 398/138, 139, 171, 90, 91, 197, 136
See application file for complete search history.

(56) References Cited

U.S. PATENT DOCUMENTS

| 0,149,821 | A1 | 10/2002 | Aronson et al. | |
|---|---|---|---|---|
| 7,057,240 | B2 * | 6/2006 | Topp et al. | 257/370 |
| 7,483,638 | B2 * | 1/2009 | Hayashi | 398/135 |
| 7,783,204 | B2 * | 8/2010 | Ishibashi | 398/198 |
| 7,933,518 | B2 * | 4/2011 | Li et al. | 398/22 |
| 2004/0067060 | A1 * | 4/2004 | Aronson et al. | 398/135 |
| 2005/0206360 | A1 * | 9/2005 | Mehas et al. | 323/282 |
| 2006/0062116 | A1 * | 3/2006 | Ishibashi | 369/47.35 |
| 2006/0133814 | A1 * | 6/2006 | Hayashi | 398/135 |
| 2006/0152271 | A1 * | 7/2006 | Fujikawa | 327/333 |
| 2008/0166131 | A1 * | 7/2008 | Hudgins et al. | 398/117 |
| 2008/0184053 | A1 * | 7/2008 | Wang et al. | 713/330 |
| 2011/0038641 | A1 * | 2/2011 | Tanaka et al. | 398/197 |

FOREIGN PATENT DOCUMENTS

| JP | 62-76800 | 4/1987 |
|---|---|---|
| JP | 63-40373 | 2/1988 |
| JP | 6-168763 | 6/1994 |
| JP | 10-320087 | 12/1998 |
| JP | 2001-272892 | 10/2001 |
| JP | 2006-42081 | 2/2006 |

OTHER PUBLICATIONS

INF-8074i Specification for SFP Transceiver, Rev 1.0, May 12, 2002, (ftp://ftp.seagate.com/sff/INF-8074.pdf), pp. 1-38.
Japanese Office Action issued on Apr. 19, 2011 for Application No. 2007-079421 w/ English language translation.

* cited by examiner

*Primary Examiner* — Kan Vanderpuye
*Assistant Examiner* — Hibret Woldekidan
(74) *Attorney, Agent, or Firm* — Smith, Gambrell & Russell, LLP

(57) ABSTRACT

A pluggable optical transceiver with a function not affecting the command status of the host system appeared in the internal bus, which is coupled with the command line within the transceiver, even when the transceiver is plugged in the host system. The optical transceiver provides a power supply circuit and a control unit. The power supply circuit, by receiving an external electric power, generates an internal electric power with a substantial time lag from a moment when the optical transceiver is plugged in the host system. The control unit communicates with the host system through the command line pulled up to the external electric power within the optical transceiver.

5 Claims, 1 Drawing Sheet

US 8,036,535 B2

PLUGGABLE OPTICAL TRANSCEIVER WITH COMMAND LINE PULLED UP TO EXTERNAL POWER SUPPLY

BACKGROUND OF THE INVENTION

1. Field of the Invention

The present invention relates to an optical transceiver that protects the internal bus in the host system from the miss-operation at the plugging of the transceiver in the host system.

2. Related Prior Art

A pluggable optical transceiver able to be plugged in the host system without turning off the power of the host system has been developed and has been commercially applied in the optical communication system. A multi-source agreement (MSA) distributed from the SFP committee through the internet, INF-8074i Specification for SFP transceiver, rev. 1,0, May 12, 2002, (ftp://ftp.seagate.com/sff/INF-8074.pdf) has been ruled specification of an optical transceiver called as SFP (Small Form-factor Pluggable) transceiver. The SFP transceiver implements a control unit that communicates with the primary control circuit of the host system via the command line when the SFP transceiver is plugged with the host system.

The input terminal of the control unit in the transceiver, which is connected with the command line, possibly receives an over-voltage on the command line. In order to protect the control unit of the transceiver, the command line may provide a protection circuit that includes a diode reversely connected with the power supply line of the transceiver and another diode reversely connected with the ground. These two diodes may limit the voltage level of the command line substantially between the power supply and the ground.

When the power supply in the transceiver is provided through the circuit that delays the supply of the power from the plugging of the transceiver with the host system, one of the protection diode connected to the power supply of the transceiver is forwardly biased during the delay of the power supply. Then the bus line within the host system that is just connected with the command line of the transceiver by plugging it with the host system probably causes an error. Specifically, while a unit connected with the bus line of the host system outputs a "H" level data, the practical data on the bus line becomes a "L" level because this bus line is connected with the command line of the transceiver and the command line is connected to the substantially ground level with the forwardly biased diode.

Whereas, the invention disclosed hereinbelow is to provide an optical transceiver by which the bus line within the host system is unaffected just after the plugging of the transceiver with the host system even when the transceiver provides an internal power supply circuit that delays the supply of the electric power to the internal unit of the transceiver.

SUMMARY OF THE INVENTION

An optical transceiver according to the present invention has a feature that the transceiver includes a power supply circuit and a control unit, the power supply circuit generating an internal electric power with a time lag from a moment when the optical transceiver is plugged in the host system and the power supply line within the transceiver is provided with the external electric power from the host system, the control unit, communicating with the host system through a command line within the optical transceiver. In the present optical transceiver, this command line is pulled up to the power supply line. This pull-up of the command line is preferable to be performed by a diode whose cathode is connected with the command line, while, the anode thereof is connected with the power supply line.

Thus, this pull-up becomes enable from a moment when the optical transceiver is plugged in the host system independent of the time lag of the power supply circuit. Accordingly, the bus line of the host system, which is connected with the command line in the optical transceiver, is not forced to be set in the low level during the time lag of the power supply circuit.

DESCRIPTION OF PREFERRED EMBODIMENTS

Figure 1:
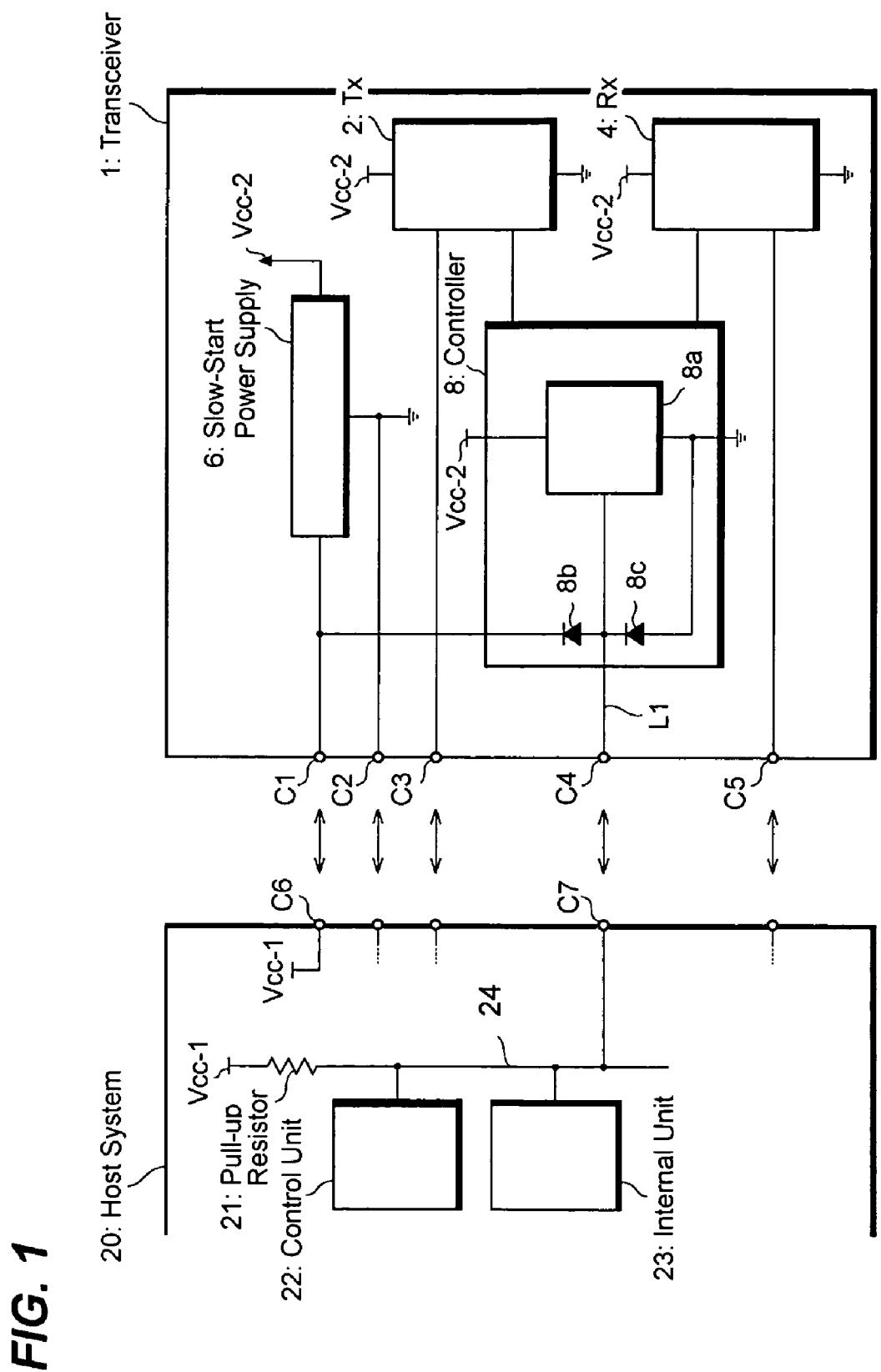
FIG. 1 shows a block diagram of the optical transceiver according to the invention and the host system coupled with the transceiver.

Next, embodiments according to the present invention will be described as referring to accompanying drawings. In the description of the drawings, the same elements or the same symbols will refer to the same elements without overlapping explanations.

FIG. 1 schematically illustrates a configuration of the optical transceiver 1 communicating with the host system 20 via the connector with the power terminal C1, the ground C2, the Tx signal terminal C3, the command terminal C4, and the Rx signal C5. The optical transceiver 1 has, what is called, the hot-pluggable function in which the transceiver 1 is plugged in or off the host system without turning off the electrical power of the host system. The terminals, C1 to C5, may be connected with the terminals including at least the power terminal C6 and the command terminal C7 of the host system 20 when the optical transceiver 1 is plugged in the host system 20. The power terminal C1 of the transceiver 1 is coupled with the power terminal C6 of the host system 1 to be provided with the external electric power from the host system 20, while, the command terminal C4 is coupled with the command terminal C7 of the host system 20 to receive the commands from the host system 20 to operate the optical transceiver 1. The optical transceiver 1 further provides an optical transmitter 2, an optical receiver 4, a power supply circuit 6 with a slow-start function, and a controller 8. These units, 2 to 8, become operable by providing the internal electric power and the command from the host system 20.

In the host system 20, the power terminal C6 is connected with the external electric power Vcc-1. The command terminal C7 is connected with the control unit 22 to control the communication with the optical transceiver 1 and internal unit 23 through the internal bus 24 of the host system 20. This internal bus 24 is pulled up to the external electric power Vcc-1 with the pull-up resistor 21. The control unit 22 controls the serial communication between the host system 20 and the optical transceiver 1 under the protocol based on the I$^2$C standard. The internal unit 23 may include a memory, a peripheral circuit and the like.

The optical transmitter (Tx) 2 in the optical transceiver 1, which is connected to the controller 8 to receive the command, may operate following the command sent from the controller 8. The optical transmitter 2, which is optically coupled with the optical fiber (not shown in the figure) to transmit signal light to the optical fiber, is connected with the power supply circuit 6 and is provided with the internal electric power Vcc-2 therefrom. The optical transmitter 2 is also connected with the Tx signal terminal C3 to receive the electrical signal to be transmitted when the optical transceiver 1 is plugged in the host system 20. Thus, the optical transmitter 2 converts the electrical signal received from the host system 20 via the Tx signal terminal C3 into the optical signal and outputs this optical signal to the optical fiber.

The optical receiver (Rx) 4 in the optical transceiver 1, which is also connected to the controller 8, is powered by being provided the internal electric power Vcc-2 from the power supply circuit 6. The optical receiver 4, coupled with the optical fiber, receives the optical signal from the optical fiber, converts this optical signal into an electrical signal, and outputs this electrical signal from the Rx signal terminal C5 to the host system 20 when the optical transceiver 1 is plugged in the host system 20.

The power supply circuit 6 provides the internal electric power to the optical transmitter 2, the optical receiver 4, the controller 8 and the like, when the optical transceiver 1 is plugged in the host system 20 to be provided with the external electrical power Vcc-1 from the host system 20 via the power terminals, C1 and C6.

In the present optical transceiver 1, the output of the power supply circuit 6, Vcc-2, becomes active in a preset voltage that is nearly equal to the voltage of the external electric power Vcc-1 with a time lag from the moment when the optical transceiver 1 is plugged in the host system 20. That is, the power supply circuit 6 delays the supply of the internal electrical power to the transmitter 2, the receiver 4 and the controller 8 from the empowering the transceiver by plugging it in the host system.

The controller 8 includes a processor 8a connected to the command terminal C4. This terminal C4 is connected with the command terminal C7 of the host system 20 when the transceiver 1 is plugged in the host system 1. The control unit 22 and the internal unit 23 in the host system 20 communicate with the processor 8a via the command terminals, C4 and C7, and the command line L1 under the I²C protocol when the transceiver 1 is plugged in the host system 20. The command line L1 is pulled up to the external electric power Vcc-1 of the host system 20 through the terminals, C1 and C6, with the diode 8b, and, at the same time, the command line L1 is pulled down to the ground through another diode 8c. Here, the communication protocol between the host system 20 and the optical transceiver 1 is not restricted to the I²C protocol of the serial communication. A resistor may pull up the command line L1 instead of the diode 8b.

The diodes, 8b and 8c, connected to the command line L1 may protect the processor 8a from applying an over-voltage thereto. Even if the potential of the command line L1 exceeds the external electric power Vcc-1 added by a forward voltage of the diode or becomes less than the ground subtracted with the forward voltage of the diode, such over-voltage may be cramped by the diode to the external electric power or the ground. The anode of the first diode 8b is connected to the command line L1, while, the cathode thereof is guided to the input of the power supply circuit, namely, the external electric power Vcc-1 of the host system 20. The cathode of the second diode 8c is connected to the command line L1, while, the anode thereof is guided to the ground. The controller 8 may begin to operate by being provided with the internal electric power Vcc-2 from the power supply circuit 6.

Because the command line L1 is protected by the first diode 8b whose cathode is connected to the external electric power Vcc-1 of the host system 20, which keeps the diode 8b to be reversely biased even the moment when the transceiver 1 is just plugged in the host system 20, accordingly, the internal bus 24 of the host system 20 may keep its ordinary condition.

When the first diode 8b in the cathode thereof is connected to the internal electric power Vcc-2 of the optical transceiver 1, this diode, just after the plugging the transceiver 1 in the host system 20 until the internal electric power Vcc-2 becomes stable in its preset condition, is forwardly biased because the internal electric power Vcc-2 is not active due to the slow-start function of the power supply circuit 6; accordingly, the internal bus 24 in the host system 20 is forced to be the LOW level, which leads an error operation of not only the host system 20 but the optical transceiver 1.

On the other hand, the optical transceiver according to the present invention, the command line L1 is pulled up by the diode 8b whose cathode is connected to the command line L1, while, the anode thereof is connected to the external electric power Vcc-1 through the power terminals, C1 and C3, accordingly, even when the power supply circuit 6 in the output thereof becomes active with the time lag from the moment when the optical transceiver 1 is plugged in the host system 20, the diode 8b may be always biased reversely and the internal bus 24 is not forced to be the LOW state.

While the preferred embodiments of the present invention have been described in detail above, many changes to these embodiments may be made without departing from the true scope and teachings of the present invention. The present invention, therefore, is limited only as claimed below and the equivalents thereof.

I claim:

1. An optical transceiver pluggable in a host system, said optical transceiver being provided with external electric power from said host system, and comprising:

a power supply circuit configured to generate, by receiving said external electric power from said host system through a power supply line in said optical transceiver, internal electric power with a time lag from a moment when said optical transceiver is plugged in said host system and said power supply line is provided with said external electric power; and a control unit provided with said internal electric power from said power supply circuit, said control unit communicating with said host system through a command line in said optical transceiver, wherein said command line is pulled up with a diode whose cathode is connected to said power supply line and whose anode is connected to said command line.

2. A pluggable optical transceiver pluggable in a host system that provides an internal bus, a host connector and external electric power, comprising:

a transceiver connector connected with said host connector when said optical transceiver is plugged in said host system, said transceiver connector including a power terminal and a command terminal;

a power supply circuit with an input terminal and an output terminal, said input terminal receiving said external electric power from said host system through said power terminal, said power supply circuit generating internal electric power with a substantial time lag from a moment when said power supply circuit receives said external electric power;

a command line communicating with said internal bus of said host system through said host connector and said command terminal; and a protection circuit coupled with said command line to protect said command line from an overvoltage, wherein said command line is pulled up with a diode having a cathode and an anode, said cathode being connected to said power terminal and said anode being coupled with said command line.

3. The pluggable optical transceiver according to claim 2, wherein said protection circuit includes another diode having an cathode and an anode, said cathode being coupled with said command line and said anode being grounded.

4. The pluggable optical transceiver according to claim 2, further comprising a control unit communicating with said host system through said command line, said command terminal and said internal bus of said host system, wherein said control unit is provided with said internal electric power and protected by said protection circuit.

5. The pluggable optical transceiver according to claim 2, wherein said internal electric power has a voltage less than a voltage of said external electric power.

* * * * *